US012391617B2

(12) United States Patent
Allemand et al.

(10) Patent No.: US 12,391,617 B2
(45) Date of Patent: Aug. 19, 2025

(54) COMPOSITE MATERIAL HAVING AN ALUMINOSILICATE MATRIX IN PARTICULAR MADE FROM BARIUM ALUMINOSILICATE (BAS) REINFORCED WITH METAL OXIDE REINFORCEMENTS, AND METHOD FOR PREPARING SAME

(71) Applicants: COMMISSARIAT À L'ÉNERGIE ATOMIQUE ET AUX ÉNERGIES ALTERNATIVES, Paris (FR); CENTRE NATIONAL DE LA RECHERCHE SCIENTIFIQUE, Paris (FR)

(72) Inventors: Alexandre Allemand, Bordeaux (FR); Romain Billard, Epernay (FR); Yann Le Petitcorps, Leognan (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 960 days.

(21) Appl. No.: 17/492,864

(22) Filed: Oct. 4, 2021

(65) Prior Publication Data
US 2022/0024821 A1    Jan. 27, 2022

Related U.S. Application Data

(62) Division of application No. 14/443,616, filed as application No. PCT/EP2013/074159 on Nov. 19, 2013, now abandoned.

(30) Foreign Application Priority Data

Nov. 20, 2012 (FR) .................................. 12 61020

(51) Int. Cl.
*C04B 35/195* (2006.01)
*C04B 35/626* (2006.01)
(Continued)

(52) U.S. Cl.
CPC ...... *C04B 35/195* (2013.01); *C04B 35/62685* (2013.01); *C04B 35/64* (2013.01);
(Continued)

(58) Field of Classification Search
CPC ....... C04B 2235/3481; C04B 2235/522–5236; C04B 2235/666
See application file for complete search history.

(56) References Cited

U.S. PATENT DOCUMENTS 4,992,318 A    2/1991  Gadkaree
5,137,848 A    8/1992  Barker et al.
(Continued)

FOREIGN PATENT DOCUMENTS

CN    1931785 A       3/2007
CN    101428971 A     5/2009
(Continued)

OTHER PUBLICATIONS

Jorge Lopez-Cuevas et al . . . "Effect of Milling Time on the Physical and Mechanical Properties of Celsian-Mullite Composites Synthesized from Coal Fly Ash." Mater. Res. Soc. Symp. Proc. vol. 1 Materials Research Society. DOI: 10.1557/opl.2012.294. Feb. 14, 2012 (Year: 2012).
(Continued)

*Primary Examiner* — Erin Snelting
(74) *Attorney, Agent, or Firm* — Chrisman Gallo Tochtrop LLC

(57) ABSTRACT

A composite material consisting of a matrix made of at least one aluminosilicate notably selected from barium aluminosilicate BAS, barium and strontium aluminosilicate BSAS,
(Continued)

strontium aluminosilicate SAS, and mixtures thereof, reinforced by reinforcements made of at least one metal or metalloid oxide, the expansion coefficient of which is close to that of said at least one aluminosilicate.

A method for preparing said composite material.

A composite material according to the invention notably finding its application in the aeronautical or aerospace field, for example for the manufacture of radomes.

15 Claims, 9 Drawing Sheets

(51) Int. Cl.
    *C04B 35/64* (2006.01)
    *C04B 35/645* (2006.01)
    *C04B 35/76* (2006.01)
    *C04B 35/80* (2006.01)

(52) U.S. Cl.
    CPC ............ *C04B 35/645* (2013.01); *C04B 35/76* (2013.01); *C04B 35/80* (2013.01); *C04B 2235/3213* (2013.01); *C04B 2235/3215* (2013.01); *C04B 2235/3436* (2013.01); *C04B 2235/3481* (2013.01); *C04B 2235/5224* (2013.01); *C04B 2235/5228* (2013.01); *C04B 2235/5232* (2013.01); *C04B 2235/5264* (2013.01); *C04B 2235/6562* (2013.01); *C04B 2235/662* (2013.01); *C04B 2235/666* (2013.01); *C04B 2235/76* (2013.01); *C04B 2235/767* (2013.01); *C04B 2235/80* (2013.01)

(56) References Cited

U.S. PATENT DOCUMENTS

| | | |
|---|---|---|
| 5,214,004 A | 5/1993 | Bansal |
| 5,256,610 A | 10/1993 | Bansal et al. |
| 5,281,559 A | 1/1994 | Bansal |
| 5,389,321 A | 2/1995 | Bansal |
| 5,538,925 A | 7/1996 | Talmy et al. |
| 5,728,445 A | 3/1998 | Murakami |
| 6,004,671 A | 12/1999 | Yamamura |
| 6,887,569 B1 | 5/2005 | Kriven et al. |
| 2005/0147866 A1 | 7/2005 | Ko et al. |
| 2006/0052231 A1 | 3/2006 | Ito et al. |
| 2008/0283465 A1 | 11/2008 | Liu et al. |
| 2013/0082421 A1 | 4/2013 | Allemand et al. |
| 2014/0004271 A1 | 1/2014 | Allemand et al. |
| 2014/0287249 A1 | 9/2014 | Allemand et al. |

FOREIGN PATENT DOCUMENTS

| | | |
|---|---|---|
| CN | 102718529 A | 10/2012 |
| EP | 0819657 A1 | 1/1998 |
| FR | 2677641 A1 | 12/1992 |
| FR | 2751321 A1 | 1/1998 |

OTHER PUBLICATIONS

Kyocera. "Coefficient of Thermal Expansion I Technical Data." https://global.kyocera.com/prdct/fc/list/tokusei/bouchou/index.html. Downloaded Jun. 16, 2020. (Year: 2020).

Dumitrescu et al. "Influence of chelating/fuel agents on the structural features, magnetic and dielectric properties of Ni ferrite." Powder Technology 268 (2014) 95-101. (Year: 2014).

Antti et al., "Thermal degradation of an oxide fibre (Nextel 720) aluminosilicate composite", Journal of the European Ceramic Society 24 (2004) pp. 565-578.

Talmy et al., "Celsian-based (BaO.AI2O3.2SiO2) ceramics as candidates for radomes", Proceedings of the 14th Conference on metal carbon and ceramic composites, NASA Con !. Publ. 3097, Part I; (1990), p. 239-237.

Bansal et al. "Fabrication of fiber-reinforced celsian matrix composites", Composites: Part A 32 (2001 ), 1021-1029.

Drummond et al., "Crystallization behavior and properties of BaO.AI2O3.2SiO2 Glass matrices", NASA Contractor report 185209, Feb. 1990.

Shabanova et al. "Structure of the BaO-AI2O3-SiO2 system (a review)", Glass and Ceramics, vol. 60, Nos. 1-2, 2003, translated from Steklo I Keramika, No. 2, p. 43-46, Feb. 2003.

Ye et al., "Synthesis of 30 wl% BAS/Si3N4 composite by spark plasma sintering", Composites Science and Technology 68 (2008), p. 1073-1079.

Kremenovic et al., "Structural and spectroscopic characterization of the quenched Hexacelsian", Journal of Physics and Chemistry of Solids 64 (2003), p. 2253-2268.

Ye et al., "Synthesis of BaAI2Si2O8 glass-ceramic by a sol-gel method and the fabrication of SiCpl/BaAI2Si2O8 composites", Journal of the European Ceramic Society, 23 (2003), p. 2203-2209.

Lee et al., "Synthesis of Hexacelsian Barium Aluminosilicate by a Solid-State Process", JACS, 83 (12), (2000) p. 2907-2912.

Search Report mailed Sep. 4, 2013 in French Application No. 1261020.

Search Report mailed Feb. 26, 2014 in International Application No. PCT/EP2013/074159.

International Preliminary Report Patentability mailed Jul. 16, 2014 in International Application No. PCT/EP2013/074159.

Non Final Office Action mailed Dec. 21, 2021 in U.S. Appl. No. 14/443,616.

Final Office Action mailed Jun. 28, 2022 in U.S. Appl. No. 14/443,616.

Non Final Office Action mailed Dec. 21, 2022 in U.S. Appl. No. 14/443,616.

COMPOSITE MATERIAL HAVING AN ALUMINOSILICATE MATRIX IN PARTICULAR MADE FROM BARIUM ALUMINOSILICATE (BAS) REINFORCED WITH METAL OXIDE REINFORCEMENTS, AND METHOD FOR PREPARING SAME

TECHNICAL FIELD

The invention relates to a composite material with an aluminosilicate matrix, more specifically made of at least one aluminosilicate selected from barium aluminosilicate BAS, barium and strontium aluminosilicate BSAS, strontium aluminosilicate SAS, and mixtures thereof, said matrix being reinforced by metal or metalloid oxide reinforcements.

The invention further relates to the method for preparing this composite material.

The composite material according to the invention notably finds its application in the aeronautical or aerospace field, for example for manufacturing radomes.

The technical field of the invention may generally be defined as that of composite materials with an aluminosilicate matrix, and notably with a barium aluminosilicate matrix.

Barium aluminosilicate fits the formula $BaAl_2Si_2O_8$ and is also generally designated by the acronym BAS.

STATE OF THE PRIOR ART

BAS is encountered in the literature in two main crystalline forms, i.e.: the celsian form or monoclinic form and the hexacelsian form (hexagonal structure of the celsian) or hexagonal form. There also exists a minor orthorhombic structure.

The monoclinic form is stable up to 1,590° C. and benefits from a low thermal expansion coefficient (from $2.3 \times 10^{-6 \circ}$ C.$^{-1}$ for its vitroceramic form [3] to $4.5 \times 10^{-6 \circ}$ C.$^{-1}$ for its monolithic form [4]).

This low thermal expansion coefficient makes this monoclinic form compatible with materials such as SiC or $Si_3N_4$ [5]. However, it is the hexagonal form which is mainly formed under normal conditions, without additions of the Sr, Ca, Mg, Li type.

The hexacelsian, hexagonal form is stable between 1,590° C. and 1,750° C. and becomes metastable between 300° C. and 1,590° C.

This hexagonal form has a much greater expansion coefficient ($8 \times 10^{-6 \circ}$ C.$^{-1}$), and consequently is not compatible with the aforementioned reinforcements.

Moreover, the hexacelsian form has polymorphism around 300° C. The lattice passes from a hexagonal structure to an orthorhombic structure with a volume variation of the order of 3%.

Consequently, the hexagonal form is an undesirable phase and its use in composite materials is banned.

However, it is possible to perform quenching for setting the hexagonal structure [6].

Composite materials with a BAS matrix benefit from the good electrical properties [1] of the BAS matrix and from its refractory nature notably with a melting temperature which may range up to 1,750° C.

In order to improve the mechanical properties of BAS, SiC or C fibers are conventionally introduced into the material during its elaboration.

These fibers, if they actually improve the mechanical properties, however make the material electrically conducting.

If one is interested in composites with a BAS matrix reinforced by carbon fibers, documents [7] and [8] show the possibility of obtaining composites with short carbon fibers.

The elaboration procedure consists of mixing oxide powders with carbon fibers in order to form a slurry, and then, after drying, sintering the whole by single-direction hot pressing for 1 hour under 20 MPa at a temperature comprised between 1,300° C. and 1,700° C. The maximum stress obtained at flexural breakage is 200 MPa for 30% of fibers (it is 100 MPa for monolithic BAS [9]). Zirconia powders are also introduced during the elaboration.

In addition to the fact that the carbon fibers make the obtained composite material electrically conducting, diffusion occurs at the interface between the oxides and the carbon fibers since carbon is known for carburizing oxides.

Studies relating to composite materials with a BAS matrix reinforced by SiC fibers are more numerous.

Indeed, the expansion coefficients of monoclinic BAS and of SiC fiber are almost identical, i.e. $4.8 \times 10^{-6}$/° C. for monoclinic BAS [4] and from 3.5 to $4.3 \times 10^{-6}$/° C. for the SiC fiber.

As regards the methods for preparing these composite materials with a reinforced BAS matrix by SiC fibers, a distinction is made on the one hand between methods which use the so-called «vitroceramic» route and the methods on the other hand which use the so-called «sintered powders» route.

The methods which use the so-called «vitroceramic» route apply vitroceramic matrices, i.e. glasses in which a heat treatment consisting of temperature plateaus gave the possibility of producing germination and growth of the crystallized phases in a more or less significant amount inside the glass.

In the methods which use the so-called «sintered powders» route, the matrix is directly made via sintered powders.

The «vitroceramic» route is often used since it guarantees good capability of densification by viscous flow in the glass condition between the fibers and the reinforcement, and the possibility of then crystallizing, gives the possibility of increasing the mechanical strength and the temperature performance.

Thus, the document [10] proposes a method for elaborating a BAS vitroceramic composite of a monoclinic structure reinforced by continuous SiC fibers elaborated by chemical vapor deposition (CVD).

This method in two steps consists of producing by the strip casting technique, pads of vitroceramic formed by a glass with inclusion of monoclinic BAS crystallites, and then of alternating these pads with SiC fibers. After having repeated the operation several times, the material is pressed by single-direction hot pressing between 1,250° C. and 1,500° C.

Two other documents apply the same SiC fibers and the same elaboration method but with matrices of different chemical natures.

The first of these documents [11] applies a barium and strontium aluminosilicate (BSAS) vitroceramic matrix. The strontium actually allows stabilization of BAS in its monoclinic form [12]. The second of these documents [13] applies a strontium aluminate (SAS) vitroceramic matrix.

Document [14] applies a BAS vitroceramic matrix containing calcium.

The matrix then essentially consists of barium aluminosilicate BAS in a monoclinic celsian form, with a molar ratio BaO/(BaO+CaO) comprised between 25% and 55%. This ratio gives the possibility of adjusting the expansion coefficient of the matrix with respect to the fiber used. The expansion coefficient range of the matrix then ranges between $4.2 \times 0^{-6}/°$ C. and $3.5 \times 10^{-6}/°$ C., while the expansion coefficient of the SiC fiber ranges between $3.5 \times 10^{-6}/°$ C. and $4.3 \times 10^{-6}/°$ C., depending on the nature of the selected fiber and on the method used for its elaboration. Consequently, there are no mechanical stresses due to cooling.

The «sintered powder» route is notably described in document [2], which shows a composite material with a monoclinic BSAS matrix ($0.75BaO$-$0.25SrO$—$Al_2O_3$-$2SiO_2$), and «Hi-Nicalon®» SiC fibers coated with BN and SiC.

The BN deposited by CVD here plays the role of a mechanical meltable small interphase with a thickness of about 0.4 µm. The SiC which covers the BN is also deposited by CVD, it has a thickness of 0.3 µm and is used as a diffusion barrier.

The method for preparing this composite material consists of preparing a slurry, comprising a binder and a plasticizer, with the BSAS powder synthesized beforehand, of depositing the slurry on a wire of SiC fibers coated with BN and then with SiC by CVD, and of then winding this wire on a mandrel.

After drying, plates of wires coated with slurry are cut out and then stacked, unbound, and sintered in a unidirectional hot press.

The obtained composite contains 42% by volume of SiC fibers. The observed stress at breakage is of the order of 400 to 470 MPa (to be compared with 100 MPa for monolithic BAS [9]), Young's modulus is 165 GPa (to be compared with 138 GPa for BAS).

Besides, there exist composite materials with an alumina matrix reinforced with alumina fibers.

The document shows a method which allows densification via a liquid route of a fibrous reinforcement texture made of alumina or made of SiC by an alumina matrix.

The method comprises a step for impregnating the fiber structure with a fluid alumina precursor, a thermoplastic resin and submicron alumina powder. The whole is then hot-pressed. In this document, the matrix is exclusively made of alumina and not made of BAS.

Therefore there exists, considering the foregoing, a need for a composite material with an aluminosilicate matrix, notably made of barium aluminosilicate «BAS», reinforced with reinforcements, which, while having good electrical and refractory properties inherent to the BAS matrix, does not have the drawbacks due to the reinforcements used up to now in these composite materials in order to improve the mechanical properties.

This composite material with a reinforced aluminosilicate matrix, notably made of barium aluminosilicate «BAS» should have excellent mechanical properties and advantageously be dense and free of cracks.

Further there exists a need for a method for preparing such a material.

The goal of the present invention inter alia is to meet these needs.

The goal of the present invention is further to provide a composite material with a reinforced matrix made of aluminosilicate, notably made of barium aluminosilicate «BAS», which does not have the drawbacks, defects, limitations and disadvantages of the composite materials of the prior art and which solves the problems of the materials of the prior art.

SUMMARY OF THE INVENTION

This goal, and further other ones are attained, according to the invention with a composite material consisting of a matrix made of at least one aluminosilicate, reinforced with reinforcements made of at least one metal or metalloid oxide, the expansion coefficient of which is close to that of said at least one aluminosilicate.

Advantageously, the matrix is made of at least one aluminosilicate selected from barium aluminosilicate BAS, barium and strontium aluminosilicate BSAS, strontium aluminosilicate SAS, and mixtures thereof.

Preferably, the matrix is (exclusively) made of barium aluminosilicate BAS.

By «close» expansion coefficient in the sense of the invention, is generally meant that the expansion coefficient of said at least one aluminosilicate, such as barium aluminosilicate BAS, and the expansion coefficient of said at least one metal or metalloid oxide do not differ by more than 30%, preferably not more than 10%.

The barium aluminosilicate BAS may in majority by mass comprise BAS with a hexagonal structure, in which case the reinforcements are then advantageously made of alumina.

Or else, the barium aluminosilicate BAS may in majority by mass comprise BAS with a monoclinic structure, in which case the reinforcements are then advantageously made of silica and/or made of mullite.

Advantageously, the reinforcements made of at least one metal or metalloid oxide appear in one or several form(s) selected from particles such as long fibers, short fibers also-called whiskers; and fabrics of fibers.

Advantageously, the matrix represents from 99 to 50% by mass of the material, and the reinforcements represent from 1 to 50% by mass of the material.

Generally, the composite material according to the invention is a dense material with a density from 80% to 100% of the theoretical density.

The composite material according to the invention, with a matrix made of aluminosilicate such as BAS and oxide reinforcements, has never been described in the prior art, as notably illustrated by the documents quoted above.

The composite material according to the invention entirely consists of oxides, since both the matrix and the reinforcements are oxides. Consequently, it may be stated that the material according to the invention behaves like a single material, a unique monolithic material. The composite material according to the invention accordingly has excellent notably mechanical properties but also electrical, and thermal properties, and these properties are generally superior to those of composite materials with an aluminosilicate matrix, for example with a BAS, SBAS, or SAS matrix, reinforced with reinforcements which are not oxides, such as C or SiC reinforcements.

The reinforcements of the material according to the invention which are made of metal or metalloid oxides are not conductive, unlike C or SiC reinforcements of the composite materials of the prior art. One of the major drawbacks of the composite materials of the prior art with C or SiC reinforcements is therefore overcome in this way.

Further, according to the invention, the expansion coefficient of the aluminosilicate such as barium aluminosilicate BAS and the expansion coefficient of said at least one metal or metalloid oxide are close to each other.

The result of this is that the composite material according to the invention is dense, and that no differential expansion leading to cracks occurs within the composite material according to the invention.

In other words, the composite material according to the invention notably because of the compatibility of the expansion coefficients of the aluminosilicate such as BAS and of the oxide of the reinforcements, is dense and free of cracks.

The composite material according to the invention may notably comprise a hexagonal BAS matrix, although it was considered up to now that this hexagonal form of BAS was undesirable and had to be avoided in such materials.

Because the hexagonal form of BAS is stable in the temperature range from 1,590° C. to 1,750° C., the composite material according to the invention, when it has a hexagonal BAS matrix will be particularly well suitable for applications in which the working temperature is located in these high ranges.

In the case when the matrix is made of hexagonal BAS, the reinforcement is advantageously made of alumina.

Alumina has the particularity of having a high melting point of 2,050° C., on the other hand, its permittivity is higher than that of BAS (9.2 at 10 GHz for $Al_2O_3$ versus 6.1 to 5 GHz for BAS).

In the case when the matrix is made of monoclinic BAS, the reinforcement is advantageously made of silica or made of mullite.

Indeed, BAS is a defined compound with congruent melting at 1,750±10° C. and is the only one in equilibrium with silica ($SiO_2$) and alumina ($Al_2O_3$).

Its equilibrium with silica and alumina therefore makes the use of these materials suitable as a reinforcement.

The silica or the alumina does not react with the matrix during its use or during the manufacturing of the composite.

Crack deviation mechanisms are promoted and therefore toughness is improved.

Further, oxide fibers of the $Al_2O_3$, $SiO_2$ type or of mullite ($3Al_2O_3 \cdot 2SiO_2$) are easily available commercially.

As a conclusion, the composite material according to the invention does not have the drawbacks of the composite materials with a reinforced BAS matrix of the prior art, and provides a solution to the problems posed by these materials.

The invention also relates to a method for preparing the composite material as disclosed above, in which the following successive steps are carried out:
   a) a powder of least one aluminosilicate is put into contact with reinforcements made of at least one metal or metalloid oxide, the expansion coefficient of which is close to that of said at least one aluminosilicate;
   b) sintering of the powder of at least one aluminosilicate and of the reinforcements made of at least one metal or metalloid oxide is carried out by a hot sintering method with a pulsed electric field (SPS);
   c) the sintered powder and reinforcements are cooled;
   d) the composite material is recovered.

Advantageously, the powder made of at least one aluminosilicate is a powder of at least one aluminosilicate selected from barium aluminosilicate BAS, barium and strontium aluminosilicate BSAS, strontium aluminosilicate SAS, and mixtures thereof.

Preferably, the powder of at least one aluminosilicate is a powder of barium aluminosilicate BAS.

The barium aluminosilicate BAS may in majority by mass comprise BAS of hexagonal structure.

Advantageously, the BAS powder, in the case when it comprises in majority by mass BAS of a hexagonal structure, is prepared by carrying out the following successive steps:
   $BaCO_3$ powder and $SiO_2$ powder are mixed in a molar ratio of 1 $BaCO_3$ for 2 $SiO_2$;
   the mixture of the $BaCO_3$ powder and of the $SiO_2$ powder is dried and then sintered, whereby a compound in majority consisting of the compound $BaSi_2O_5$ is obtained;
   the compound in majority consisting of $BaSi_2O_5$ is milled, whereby a powder of said compound in majority consisting of $BaSi_2O_5$ is obtained;
   the powder of the compound in majority consisting of $BaSi_2O_5$, and $Al_2O_3$ powder are mixed in a molar ratio of 1 $BaSi_2O_5$ for 1 $Al_2O_3$;
   the mixture of the powder of the compound in majority consisting of $BaSi_2O_5$ and of the $Al_2O_3$ powder is dried and sintered, and the sintered mixture is milled, whereby a BAS powder is obtained, which in majority comprises BAS of hexagonal structure.

When the barium aluminosilicate BAS in majority by mass comprises BAS of hexagonal structure, the reinforcements are then advantageously made of alumina.

Or else, the barium aluminosilicate BAS may in majority by mass comprise BAS of monoclinic structure in which case the reinforcements are then advantageously made of silica and/or made of mullite.

Advantageously, the reinforcements made of at least one metal or metalloid oxide appear in one or several form(s) selected from particles such as long fibers, and short fibers also called whiskers; and fabrics of fibers.

In an embodiment, during step a), a mixture of the powder of at least one aluminosilicate, such as barium aluminosilicate powder, and of particles made of at least one metal or metalloid oxide is prepared.

In another embodiment, during step a), a fabric of fibers made of at least one metal or metalloid oxide is impregnated with a slip (slurry) of the powder of at least one aluminosilicate, such as barium aluminosilicate powder.

A method allowing the preparation of a composite material with an aluminosilicate matrix, such as BAS, and with oxide reinforcements has never been described in the prior art.

The method according to the invention for the first time surprisingly allows the preparation of such a composite material with an aluminosilicate matrix, such as BAS and with oxide reinforcements.

The use of «SPS» for preparing such a composite material has never been described or suggested in the prior art as this has been studied above.

Although a few documents deal with sintering of powders, none of them applies «SPS» as a sintering means.

It is specifically the application of the «SPS» technique which, surprisingly, gives the possibility of obtaining the dense, non-cracked composite material, with an aluminosilicate matrix such as BAS, and with oxide reinforcements according to the invention. It appears that only the method according to the invention gives the possibility of obtaining a dense and non-cracked composite with a matrix made of aluminosilicate, such as BAS, and with oxide reinforcements.

The «SPS» technique applied according to the invention ensures very rapid sintering which gives the possibility of setting the high temperature phases, and notably the hexagonal, hexacelsian, metastable high temperature phase of BAS.

The method according to the invention for the first time allows preparation of a stabilized composite material with a hexagonal BAS matrix although it was considered up to now that this hexagonal form of BAS was undesirable in such materials.

The hexagonal form of the BAS has the particularity of having the same expansion coefficient as alumina and will therefore preferably be used with reinforcements made of this oxide.

BRIEF DESCRIPTION OF THE DRAWINGS

Other features and advantages of the invention will become better apparent upon reading the description which follows, given as an illustration and not as a limitation with reference to the appended figures, wherein.

Time (in minutes) is plotted in abscissas and the temperature (in ° C.) is plotted in ordinates.

Figure 3:
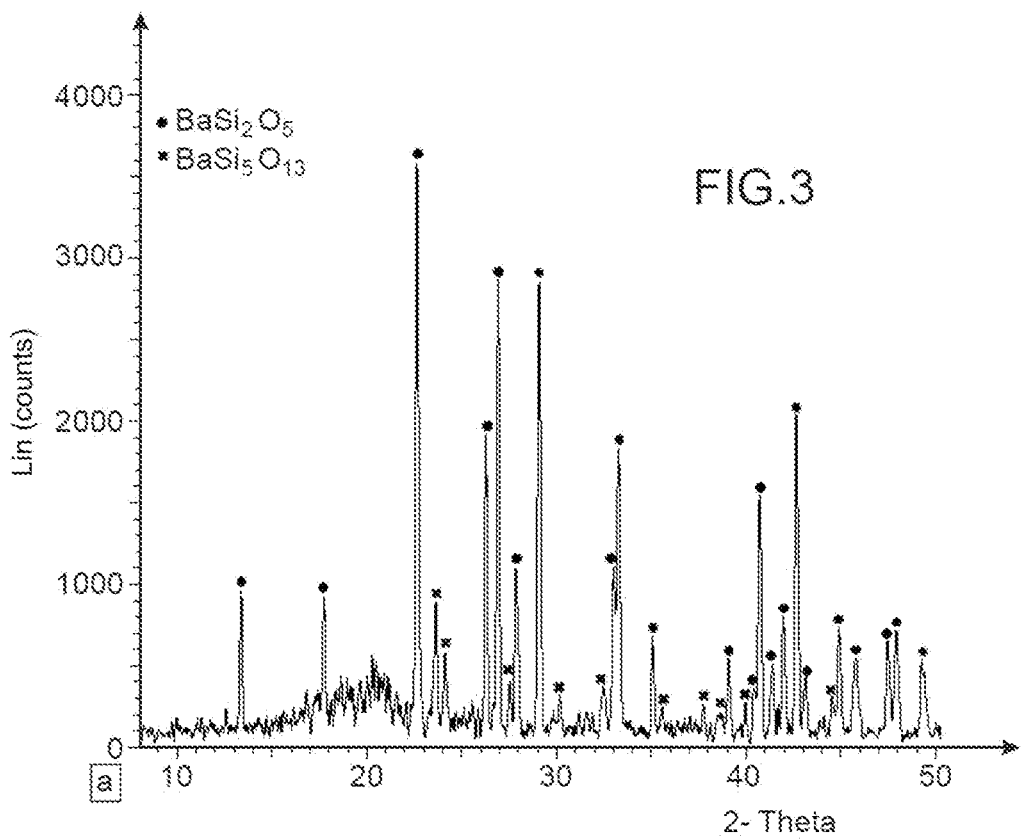

FIG. 3 is a diffractogram obtained during XRD analysis (X-Ray Diffraction on a powder) of a pellet consisting of a mixture of $BaCO_3$ and $SiO_2$ powders having been subject to a first heat treatment of sintering with a plateau at 1,150° C. for 4 hours in a tubular oven.

2 Theta (in angle degrees) is plotted in abscissas and Lin (in counts) is plotted in ordinates.

Figure 4:
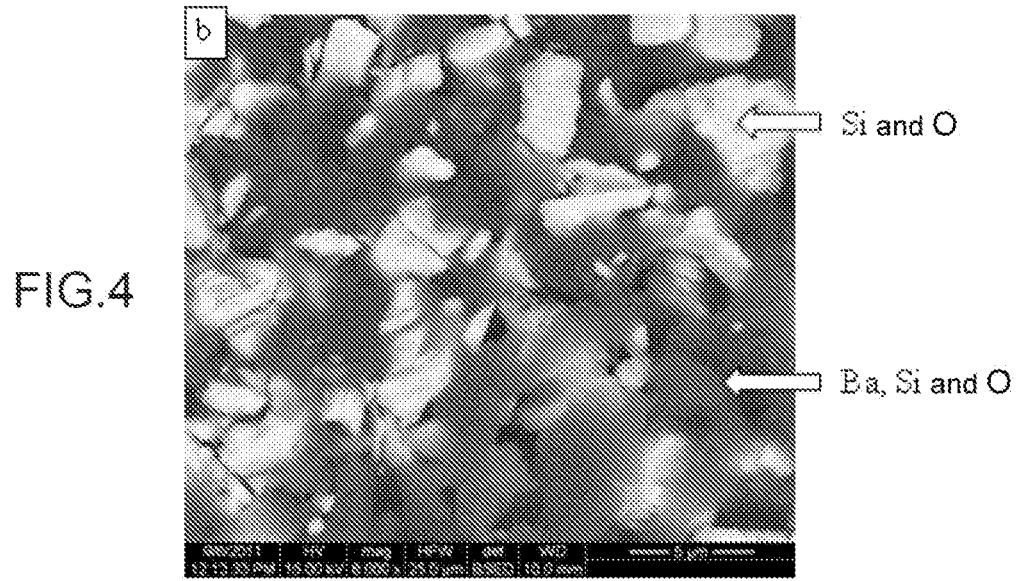

FIG. 4 shows a micrograph obtained with a scanning electron microscope of a cut of a pellet consisting of a mixture of $BaCO_3$ and $SiO_2$ powders having been subject to a heat sintering treatment with a plateau at 1,150° C. for 4 hours in a tubular oven.

The scale plotted in FIG. 4 represents 5 μm.

Figure 5:
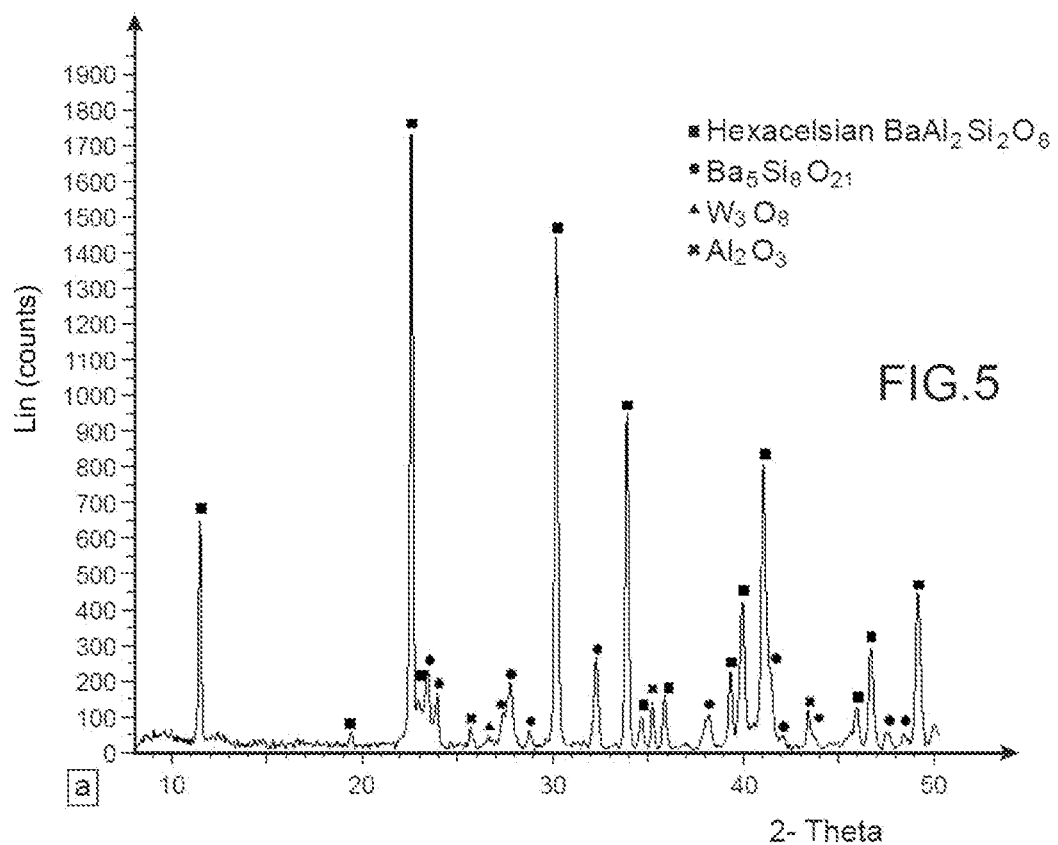

FIG. 5 is a diffractogram obtained during XRD analysis of a pellet obtained after a second sintering treatment in a tubular oven with a plateau at 1,200° C. for 6 hours.

2 Theta (in °) is plotted in abscissas, and Lin (in counts) is plotted in ordinates.

Figure 6:
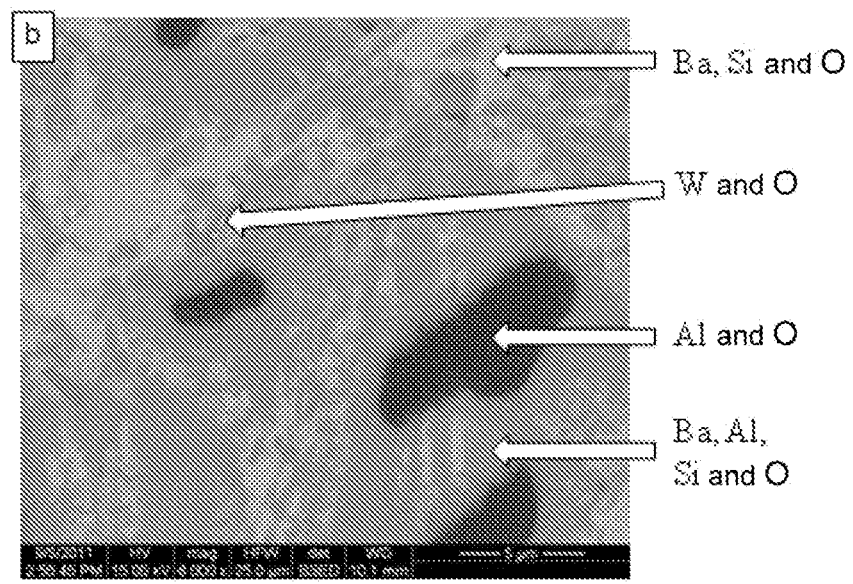

FIG. 6 shows a micrograph, obtained with a scanning electron microscope, of a cut of a pellet obtained after a second sintering treatment in a tubular oven with a plateau at 1,200° C. for 6 hours.

The scale plotted in FIG. 6 represents 5 μm.

Figure 7:
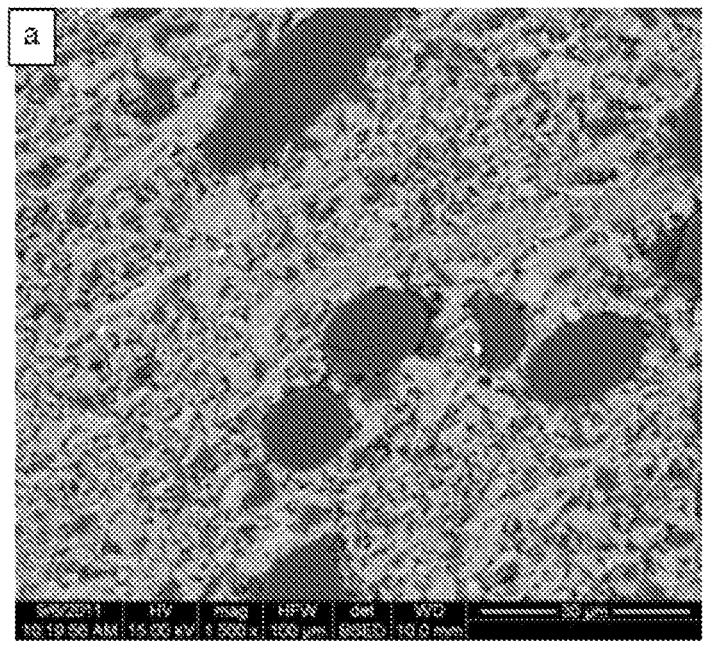

FIG. 7 shows a micrograph, obtained with a scanning electron microscope of a composite material with a BAS matrix reinforced by alumina fibers, prepared by sintering by SPS at a temperature of 1,000° C. for 5 minutes.

The scale plotted in FIG. 7 represents 30 μm.

Figure 8:
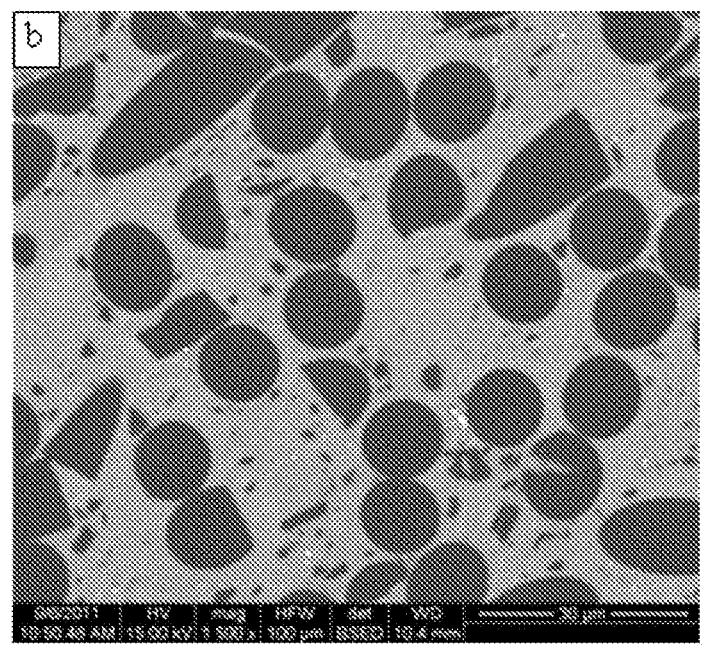

FIG. 8 shows a micrograph, obtained with a scanning electron microscope of a composite material with a BAS matrix reinforced by alumina fibers, prepared by sintering by SPS at a temperature of 1,200° C. for 5 minutes.

The scale plotted in FIG. 8 represents 30 μm.

Figure 9:
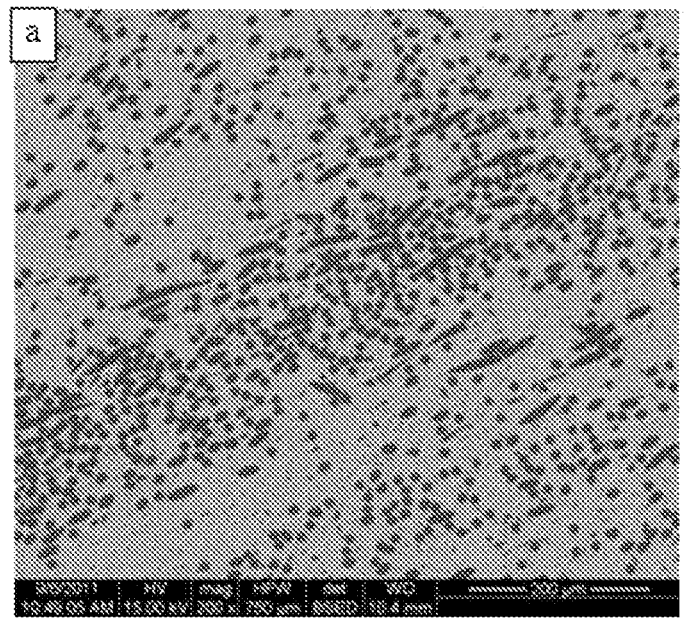

FIG. 9 shows a micrograph obtained with a scanning electron microscope at a magnification of 200 of a composite material with a BAS matrix reinforced by alumina fibers, prepared by sintering by SPS at a temperature of 1,200° C. for 5 minutes.

The scale plotted in FIG. 9 represents 200 μm.

Figure 10:
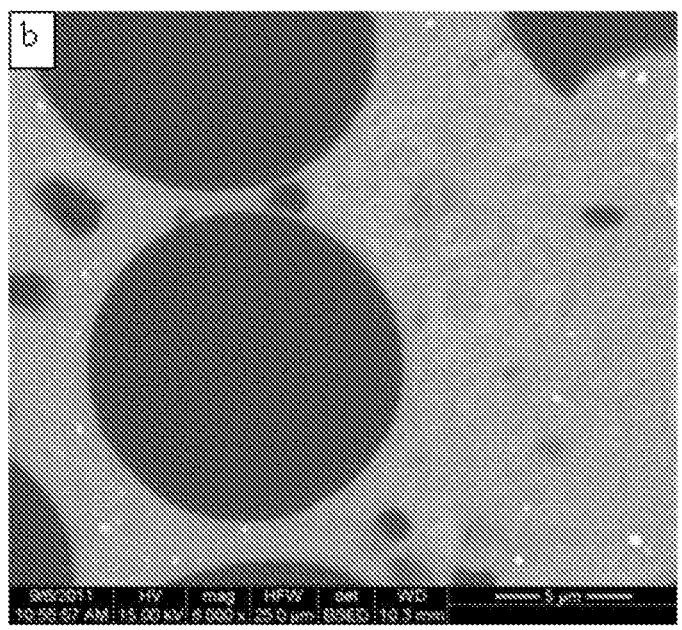

FIG. 10 shows a micrograph, obtained with a scanning electron microscope at a magnification of 6,000 of a composite material with a BAS matrix reinforced by alumina fibers, prepared by sintering by SPS at a temperature of 1,200° C. for 5 minutes.

The scale plotted in FIG. 10 represents 5 μm.

Figure 11:
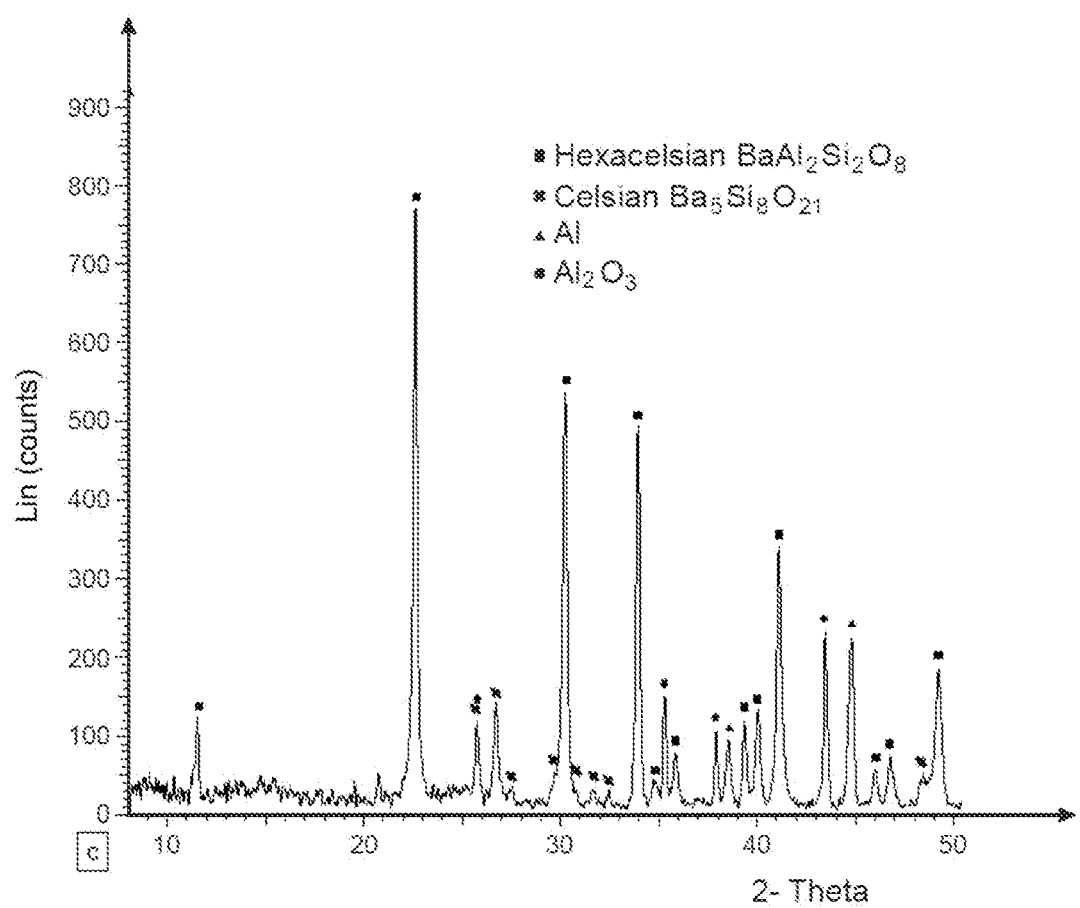

FIG. 11 is a diffractogram obtained during XRD analysis of the core of a composite material with a BAS matrix reinforced by alumina fibers, prepared by sintering by SPS at a temperature of 1,200° C. for 5 minutes.

2 Theta (in °) is plotted in abscissas, and Lin (in counts) is plotted in ordinates.

Figure 12:
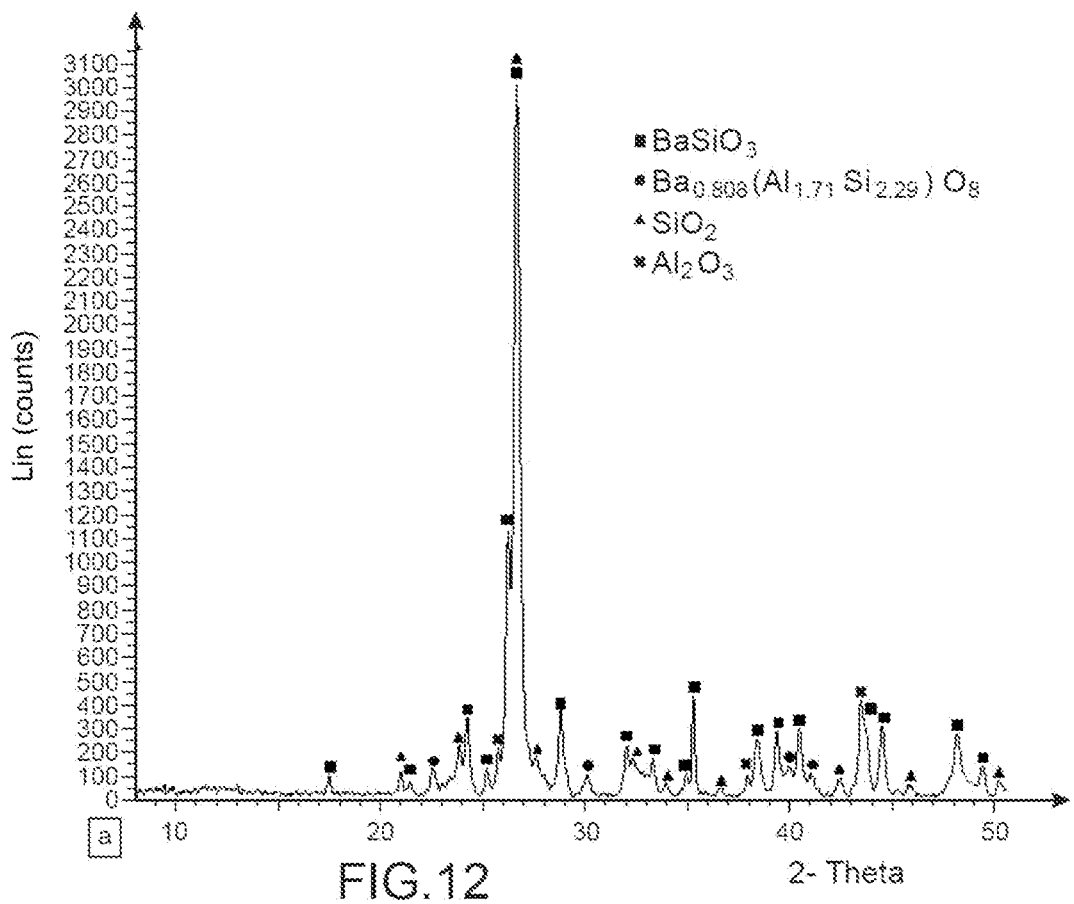

FIG. 12 is a diffractogram obtained during XRD analysis of a pellet consisting of the three $BaCO_3$, $Al_2O_3$, and $SiO_2$ powders after sintering by SPS at 1,000° C. for 5 minutes.

2 Theta (in °) is plotted in abscissas, and Lin (in counts) is plotted in ordinates.

Figure 13:
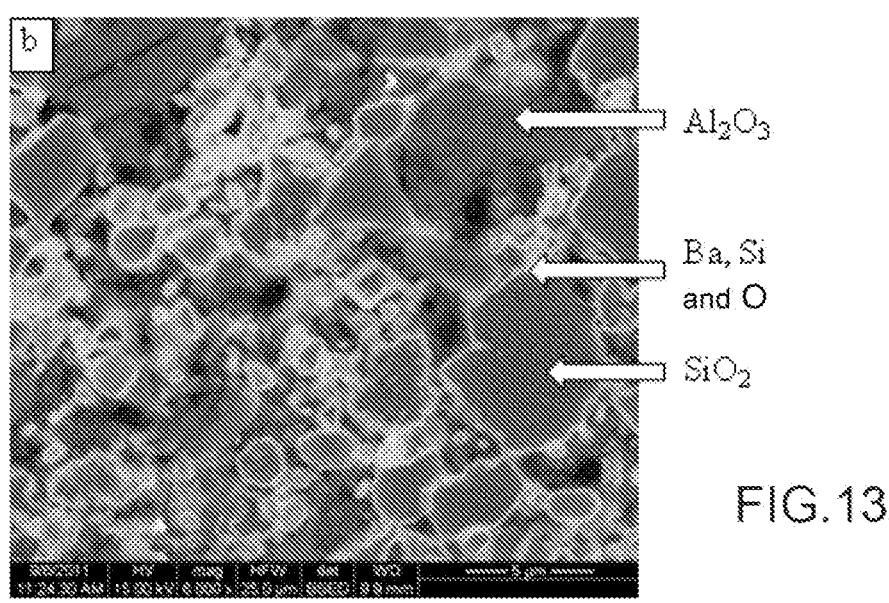

FIG. 13 shows a micrograph, obtained with a scanning electron microscope of a cut of a pellet formed by the three $BaCO_3$, $Al_2O_3$, and $SiO_2$ powders after sintering by SPS at 1,000° C. for 5 minutes.

The scale plotted in FIG. 13 represents 5 μm.

Figure 14:
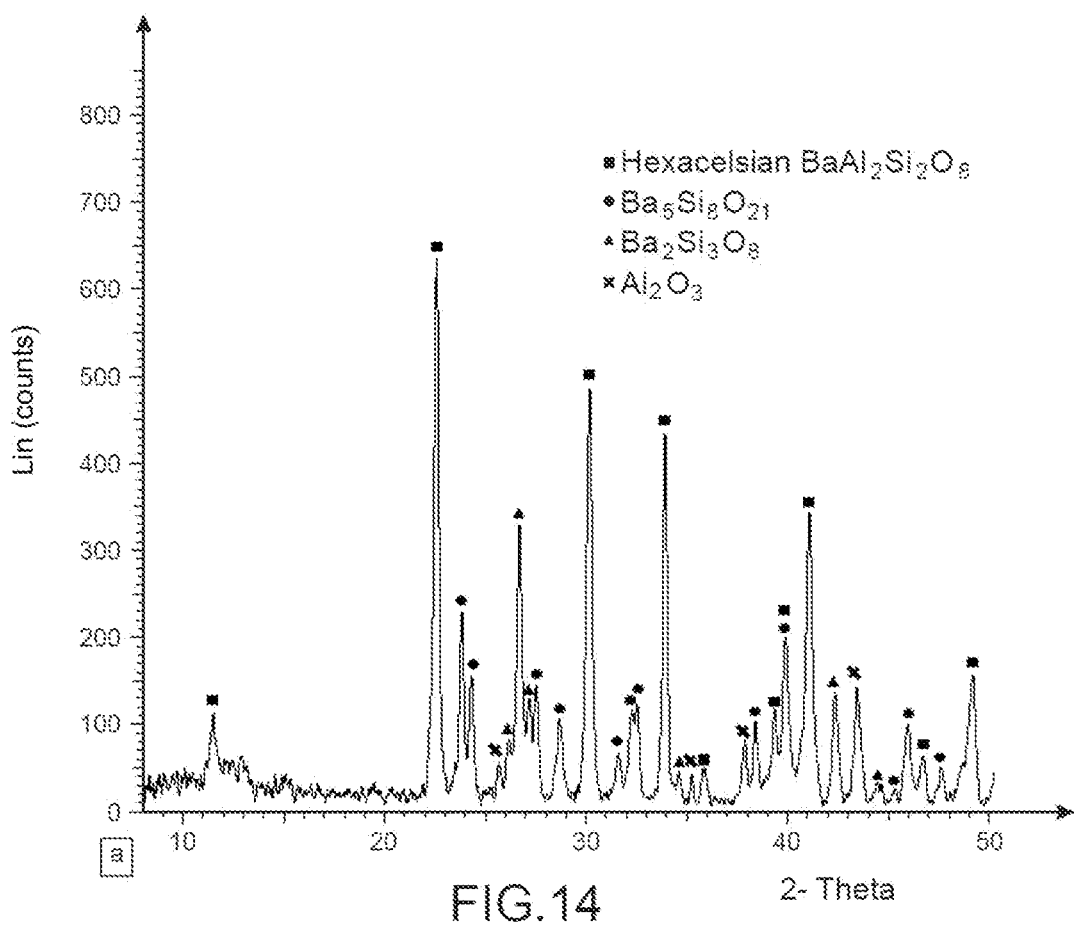

FIG. 14 is a diffractogram obtained during XRD analysis of a pellet consisting of the three $BaCO_3$, $Al_2O_3$, and $SiO_2$ powders, the $SiO_2$ powder being coarser and the $Al_2O_3$ powder being finer, after sintering by SPS at 1,000° C. for 5 minutes.

2 Theta (in °) is plotted in abscissas, and Lin (in counts) is plotted in ordinates.

Figure 15:
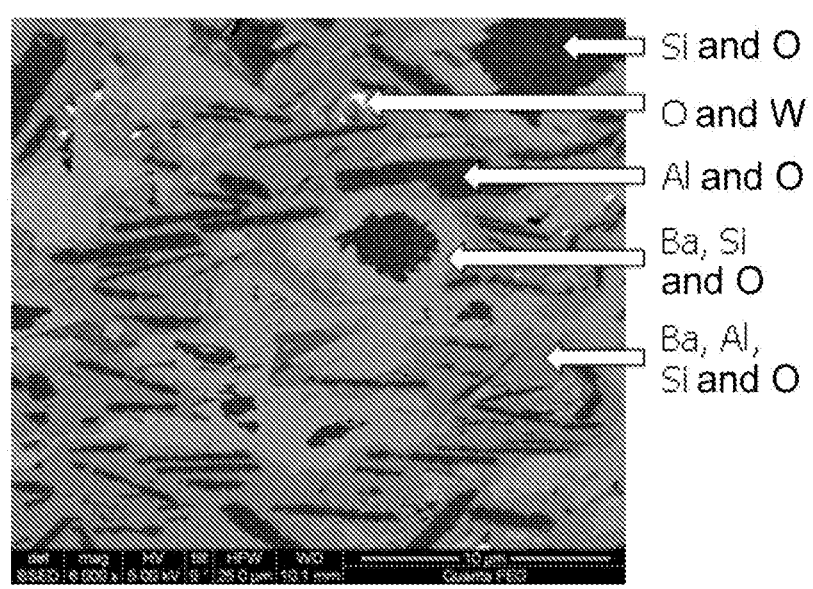

FIG. 15 shows a micrograph obtained by a scanning electron microscope of a cut of a pellet consisting of the three $BaCO_3$, $Al_2O_3$, and $SiO_2$ powders, the $SiO_2$ powder being coarser and the $Al_2O_3$ powder being finer, after sintering by SPS at 1,000° C. for 5 minutes. The scale plotted in FIG. 15 represents 10 μm.

Figure 16:
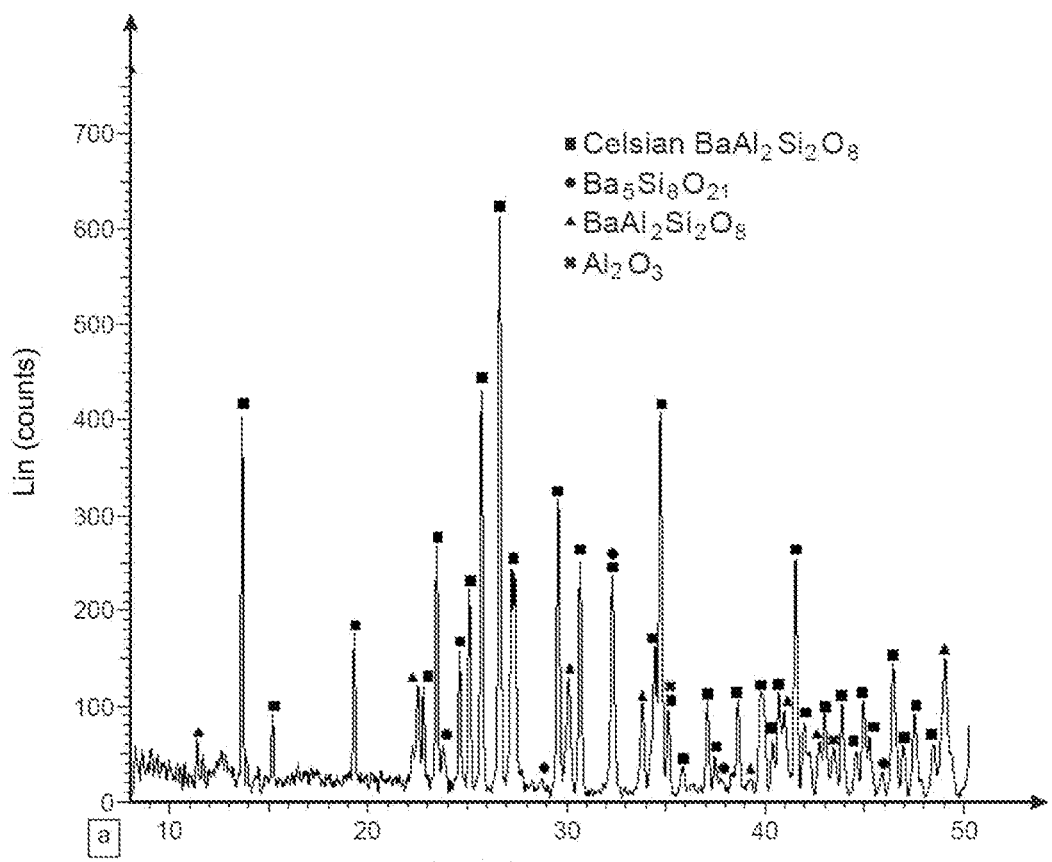

FIG. 16 is a diffractogram obtained during XRD analysis of a pellet after an annealing treatment with a plateau at 1,150° C. for 4 hours.

2 Theta (in °) is plotted in abscissas, and Lin (in counts) is plotted in ordinates.

Figure 17:
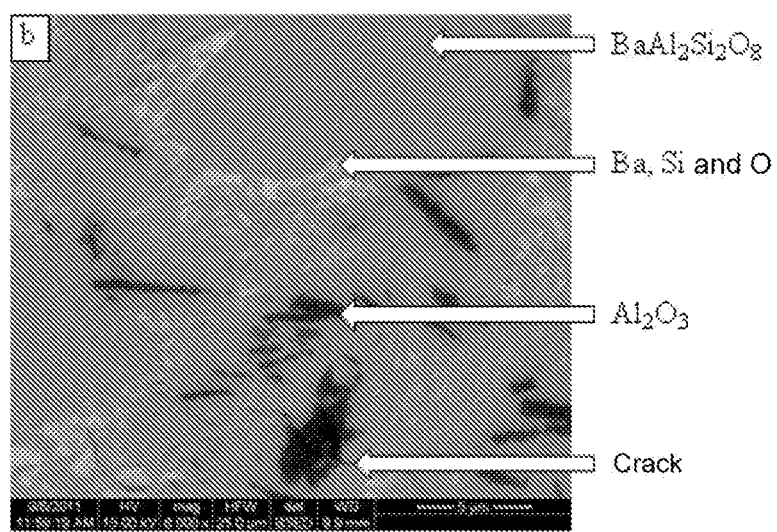

FIG. 17 shows a micrograph, obtained with a scanning electron microscope of a pellet after an annealing treatment with a plateau at 1,150° C. for 4 hours.

The scale plotted in FIG. 17 represents 5 μm.

DETAILED DISCUSSION OF PARTICULAR EMBODIMENTS

The description which follows is rather made, by convenience, with reference to the method for preparing the composite material according to the invention but it is quite obvious that it also contains teachings which apply to the composite material according to the invention.

The description which follows is also rather made with reference to the preparation of a composite material for which the matrix is in a single aluminosilicate, i.e. BAS. But it is quite obvious that this description may be easily adapted by one skilled in the art, for allowing the preparation of a composite material, the matrix of which is generally at least one aluminosilicate, whichever this or these aluminosilicate(s).

This aluminosilicate may for example be selected from barium aluminosilicate BAS, barium and strontium aluminosilicate BSAS, strontium aluminosilicate SAS and mixtures thereof.

In the first step of the method according to the invention, a barium aluminosilicate BAS powder and reinforcements made of at least one metal or metalloid oxide, the expansion coefficient of which being close to that of barium aluminosilicate, are put into contact.

The barium aluminosilicate BAS powder may in majority comprise BAS with a hexagonal structure.

By «in majority», is generally meant that the BAS powder comprises more than 50% by mass, preferably more than 80% by mass of BAS with a hexagonal structure, still preferably 100% by mass of BAS of hexagonal structure.

The remainder of the BAS powder may comprise as a minority, one or several impurities for example selected from alumina, silica and barium silicates such as $Ba_5Si_8O_{21}$ and $Ba_3Si_5O_{13}$.

As this is specified later on, when the BAS powder in majority comprises BAS with a hexagonal structure, the reinforcements are then made of alumina.

Or else, the barium aluminosilicate BAS powder may in majority comprise BAS of monoclinic structure.

By «in majority», is generally meant that the BAS powder comprises more than 50% by mass, preferably more than 80% by mass of BAS of monoclinic structure, still preferably 100% by mass of BAS of monoclinic structure.

As this is specified later on, when the BAS powder in majority comprises BAS of monoclinic structure, the reinforcements are then made of silica and/or made of mullite.

The barium aluminosilicate powder may consist of particles of any shape for example of a spherical or spheroidal shape.

The average size—defined by their largest dimension—of the particles of the barium aluminosilicate powder is generally from 10 nm to 100 microns, preferably from 1 micron to 10 microns.

A new procedure, operating method was developed according to the invention which gives the possibility of obtaining a BAS powder which in majority comprises BAS of hexagonal structure.

This operating method, a procedure, which has already been described above consists of reacting successively and not in one go, the $BaCO_3$, $Al_2O_3$, and $SiO_2$ compounds [16].

This operating method therefore comprises the following successive steps:

(1) The $BaCO_3$ powder and the $SiO_2$ powder are mixed in a molar ratio of 1 $BaCO_3$ for 2 $SiO_2$.

This mixture may be carried out via a wet route in a liquid such as ethanol.

Thus, it will for example be possible to mix the $BaCO_3$ powder and the $SiO_2$ powder for 30 minutes for example in a liquid such as ethanol, in a milling machine such as a RETSCH milling machine (ball milling machine) made of WC (tungsten carbide).

(2) The mixture of the $BaCO_3$ powder and of the $SiO_2$ powder is dried and then sintered.

This drying and this sintering may be carried out for a period from 1 to 10 hours, for example 4 hours, at a temperature from 1,000° C. to 1,400° C., for example 1,150° C., for example in air, in a device such as a tubular oven. At the end of this step, a sintered mixture of the $BaCO_3$ powder and of the $SiO_2$ powder is obtained, in majority consisting in moles (chemical composition), of $BaSi_2O_5$. This compound is then milled for a period from 10 minutes to 2 hours, for example for a period of 1 hour. This milling may be carried out via a wet route in a liquid such as ethanol.

For example a RETSCH milling machine (ball milling machine) made of WC may be used.

(3) The obtained product at the end of the step (2) is mixed with $Al_2O_3$ powder in a molar ratio of 1 $BaSi_2O_5$ for 1 $Al_2O_3$.

This mixing may be achieved via a wet route in a liquid such as ethanol.

Thus, it will for example be possible to mix the sintered mixture with $Al_2O_3$ powder for example for 30 minutes in a liquid such as ethanol, in a milling machine such as for example a RETSCH milling machine (ball milling machine) made of WC.

(4) The obtained mixture at the end of step (3) is dried and then sintered.

This drying and this sintering may be carried out for a period from 1 to 10 hours, for example 6 hours, at a temperature from 1,000° C. to 1,400° C., for example 1,200° C., for example in air in a device such as a tubular oven.

The product obtained at the end of this step in majority consists, i.e. at more than 50%, or even at more than 80% by mass of hexagonal BAS. However, there still remains alumina, and barium silicate but these secondary phases are not redhibitory for the remainder of the method.

This product, obtained at the end of step (4), is milled for a period from 1 minute to 2 hours, for example for a period of 1 hour.

A powder in majority consisting of hexagonal BAS is then obtained.

This milling may be carried out via a wet route in a liquid such as ethanol.

For example a RETSCH milling machine (ball milling machine) made of WC may be used.

It should be noted that by extending the duration of the second heat treatment of step (4), for example up to a duration from 6 hours to 20 hours, for example 10 hours, it is possible to reduce the amount of secondary phases.

When it is desired to use monoclinic BAS and not hexagonal BAS, an extended heat treatment for example for a duration from 1 hour to 10 hours, at a low temperature, for example around 300° C., gives the possibility of transforming the hexagonal BAS into monoclinic BAS.

Said metal or metalloid oxide may be selected from alumina, silica and mullite.

According to the invention, the barium aluminosilicate BAS and said at least one metal or metalloid oxide have "close" expansion coefficients.

By "close" in the sense of the invention, is generally meant that the expansion coefficient of barium aluminosilicate BAS and the expansion coefficient of said at least one metal or metalloid oxide do not differ by more than 30%, preferably no more than 10%.

The man skilled in the art can easily determine from among metal or metalloid oxides which are the metal or metalloid oxides which satisfy this condition as to the expansion coefficient and which may therefore be used in the material according to the invention.

The BAS with a hexagonal structure has a thermal expansion coefficient of $8 \times 10^{-6°}$ $C.^{-1}$, it will therefore be compatible with alumina which has an expansion coefficient close to $8 \times 10^{-6°}$ $C.^{-1}$.

The BAS of monoclinic structure as for it has a thermal expansion coefficient of $2.3 \times 10^{-6°}$ $C.^{-1}$ for its vitroceramic form, to $4.5 \times 10^{-6°}$ $C.^{-1}$ for its monolithic form (both of these forms may be used), it will therefore be rather compatible with silica or mullite.

In an embodiment, during step a), a mixture of the barium aluminosilicate powder and of particles of said at least one metal or metalloid oxide is prepared.

These particles may have any shape.

These may for example be grains with a spherical or spheroidal shape, long fibers or further short fibers also-called whiskers.

The fibers generally have a circular or quasi-circular cross-section.

The long fibers generally have a length from 100 microns to 10 mm, and a diameter from 3 microns to 20 microns.

The short fibers, or whiskers generally have a length of 0.5 microns to less than 100 microns (in other words from 0.5 micron to 100 microns, the value of 100 microns being excluded) and a diameter from 0.5 micron to 3 microns.

Thus, it will for example be possible to use alumina fibers with a diameter of 10 μm, and with a length after being cut out of about 1 mm.

The alumina fibers are generally deenzymated beforehand for example by a heat treatment in an oven at 500° C. in air.

Such fibers are generally available from 3M® under the name of NEXTEL.

The mixing of the barium aluminosilicate powder, for example of the hexagonal BAS powder, and of the particles of at least one metal or metalloid oxide, for example of alumina fibers may be carried out by any known mixing method.

This mixing may be carried out via a wet route in a liquid such as ethanol.

Thus, it will for example be possible to carry out this mixing for a duration of 0.5 minute to 60 minutes, for example 1 minute, in a liquid such as ethanol, in a milling machine such as for example a RETSCH milling machine (ball milling machine) made of WC.

In another embodiment, during step a), the contacting is achieved by impregnating a fabric of fibers made of at least one metal or metalloid oxide with a slip (slurry) of the barium aluminosilicate powder. In other words, in this embodiment, the reinforcement is a fibrous reinforcement consisting of woven long fibers.

Sintering of the barium aluminosilicate powder and of the reinforcements made of at least one metal or metalloid oxide is then achieved by a hot sintering method with a pulsed electric field.

The hot sintering technology with a pulsed electric field ("spark plasma sintering" or "SPS") is also known under the name of "field activated sintering technique" or FAST or further under the name of "flash sintering". This method notably allows rapid densification of powders.

"SPS" is a sintering technique which consists of simultaneously applying on the powdery sample to be densified an uniaxial pressure and pulses of a high intensity current which cause a rise in temperature of the sample. The current is applied as trains of current pulses, for example with a period of 3.2 ms, the intensity of which may attain several thousands of amperes, for example up to 8,000 A, or even 50,000 A.

The current is applied to the sample via an assembly of graphite plates and pistons, the mixture of the BAS powder and of the particles of at least one oxide is inserted into the inside of a matrix, sleeve, tableting machine, or graphite mould.

The assembly formed by the sleeve, tableting machine, or mould, the pistons and plates, is the only assembly in the vacuum chamber to rise in temperature.

Figure 1:
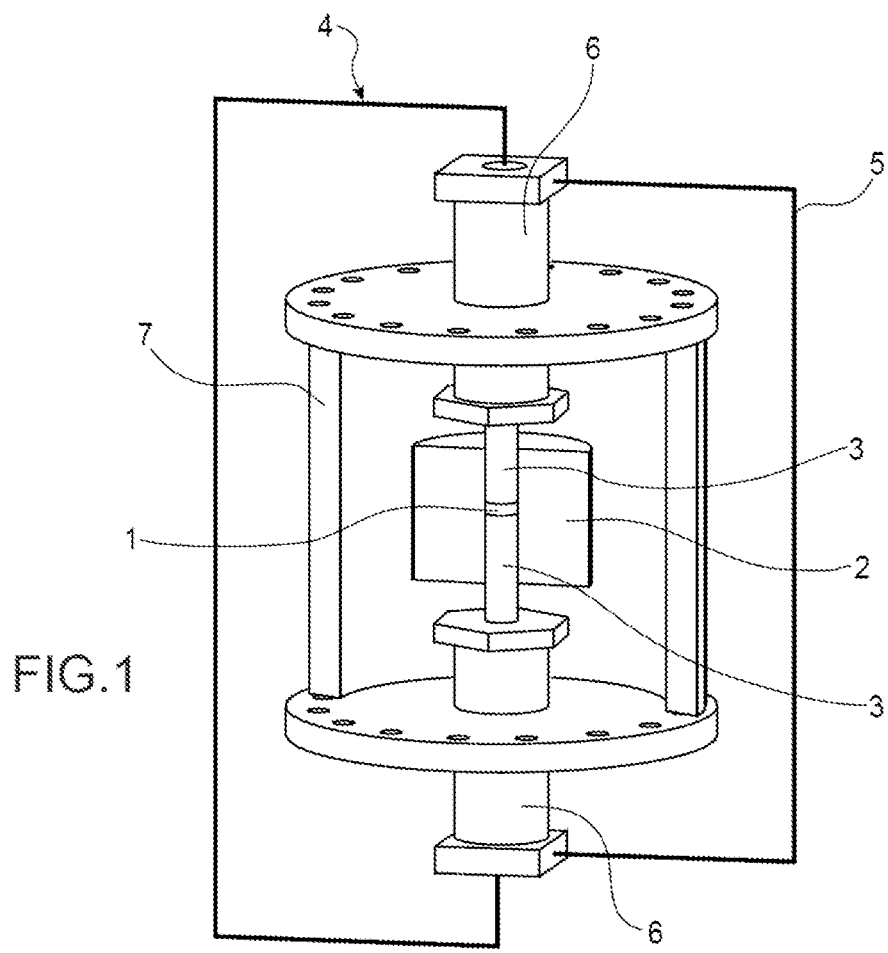
FIG. 1 is a schematic vertical sectional view of an exemplary SPS device for applying the method according to the invention.

More exactly, the operating principle of an SPS device is illustrated in FIG. 1, suitable for applying the method according to the invention, and its main members. The mixture of the BAS powder and of the particles of at least one oxide (1) (or the impregnated fabric of fibers), is placed in a mould, a sleeve, a matrix, a graphite tableting machine (2), between two pistons also in graphite (3). Pressure (4) is applied to these pistons (3), and a DC current (5) is applied to electrodes (6). The mixture of the BAS powder and of the particles of at least one oxide (1), the pistons (3), the graphite sleeve (2) and a portion of the electrodes (6) are placed inside a vacuum chamber (7).

The temperature is tracked via an optical pyrometer which also controls the electric power injected into the assembly.

The main benefit of "SPS" technology is to rise the temperature with a minimum of heat energy and to densify the mixture of powder and of particles in relatively short times of the order of a few minutes, for example from 5 to 10 minutes.

The rapidity of the sintering allows limitation of the diffusion or grain growth phenomena which has the effect of retaining submicron grain sizes and complex architectures such as those of composite materials. It is possible to attain a density close to 100%.

Generally one begins by placing the mixture of the BAS powder and of the particles of at least one oxide inside the mould, the tableting machine, the sleeve, the graphite matrix of the machine, the "SPS" device, described above.

Generally, a flexible graphite sheet such as the product marketed under the commercial name of PAPYEX® by Carbone Lorraine is placed between the mixture of powder and particles and the internal walls of the mould and between the powder and the pistons. This sheet has the purpose of preventing the powders from reacting with the mould and the pistons and of preserving them.

The PAPYEX® may be coated on one of its faces, i.e. the face in contact with the mixture of powder and particles, with a boron nitride BN layer.

The BN plays the role of a diffusion barrier between the oxides and the graphite.

The graphite mould may also be covered with a graphite felt for limiting radiation.

The tableting machine, the matrix, the sleeve, the graphite mould and the pistons are then placed in the SPS machine such as the machine described in FIG. 1.

The vacuum chamber is closed and then application of a vacuum is initiated. When the desired vacuum is attained, i.e. when the pressure is generally less than 10 Pa, the sintering operation by SPS strictly speaking may then begin.

A sufficient pressure is applied to said mixture of BAS powder and of particles of at least one oxide, and simultaneously a sufficient pulsed electric current is applied to said mixture in order to raise the temperature of the part up to a sufficient temperature in order to cause sintering of the mixture of the BAS powder and of the particles of at least one oxide.

In other words, when anything is in contact (tableting machine, pistons, mixture), it is possible to generate an electric current in order to generate the rise in temperature. Generally, the maximum number of amperes which a matrix may support is notably related to its diameter. Thus, for a sample diameter of 8 mm, it is possible to apply 2,000 A without any risk of deteriorating the matrix. For larger diameters such as 20 mm, it is possible to apply 4,000 A or more.

The applied pulsed electric current is generally from 1 A to 50,000 A in order to generate a rise in temperature up to a temperature (plateau temperature) comprised between 1,000° C. and 2,500° C. The pressure which is applied at the same time corresponds to an applied force from 0.01 MPa to 500 MPa.

Preferably, the applied pressure according to the invention is generally from 1 to 200 MPa and the applied intensity is preferably from 500 to 8,000 A. Preferably, the pressure is from 10 to 150 MPa, still preferably from 20 to 100 MPa, for example 40 MPa.

Preferably, the intensity is from 200 to 6,000 A, still preferably from 300 to 1,000 A.

The pressure and intensity values are selected inside the ranges above so that the temperature of the mixture of BAS powder and of particles of at least one oxide is raised to a temperature (plateau temperature) allowing sintering of the mixture of BAS powder and of particles of at least one oxide and its densification, preferably its total densification.

Such a temperature is generally from 700° C. to 2,000° C., preferably from 1,000° C. to 1,500° C., still preferably from 1,100° C. to 1,300° C., for example 1,200° C.

The duration during which said temperature (still called a plateau temperature) for example 1,200° C. is maintained, a duration which may also be called a plateau duration or time is a short duration generally from 0 to 10 minutes, preferably from 0 to 7 minutes, for example 5 minutes.

When the plateau time is equal to 0, this means that a rise in temperature up to the maximum temperature is carried out and then the temperature is lowered to room temperature without observing any plateau.

It will be noted that this plateau duration is in every case very short, with regard to the other sintering methods.

Such a very short sintering duration is particularly advantageous in the case when BAS is hexagonal BAS, since it gives the possibility of "setting" the metastable hexagonal high temperature phase of BAS.

Also, the cycle time excluding cooling, and the total overall duration of the complete cycle with cooling are reduced.

This cycle time is for example from 10 to 30 minutes, notably from 20 to only 22 minutes, and the duration of the complete cycle is of about one hour, which is another advantage of the method according to the invention.

Generally it is important to control the lowering of the temperature and of the pressure in order to avoid cracking of the composite material.

The cooling of the material is generally carried out in a not too sudden way as one skilled in the art in this field of the art may understand. Thus, generally a cooling rate from 1° C. to 600° C. per minute, for example from 10° C. to 100° C./min will be observed from the temperature plateau.

Preferably, the cooling is carried out with successive ramps having different slopes, thus the cooling may for example be carried out as follows: 45° C./min from the plateau temperature up to 600° C.; and then cooling depending on the inertia of the machine from 600° C. to room temperature.

It is obvious for the man skilled in the art that the temperature-pressure cycle has to be optimized for each type of mixture of BAS powder and of particles of at least one oxide, which is applied. On the other hand, regardless of the rises, lowerings or durations of the plateaus in temperature and pressure, simultaneity of the temperature and of the pressure is indispensable for good sintering of the mixture of the BAS powder and of the particles of at least one oxide.

Advantageously, the temperature and therefore intensity parameters and pressure parameters (or of the applied force, the pressure depending on the supporting surface according to the well known relationship P=F/S) are not from room temperature and a pressure of 0 MPa, applied in a sudden way, instantaneously, but are gradually raised from room temperature and a pressure of 0 MPa.

For the temperature (governed by the intensity), a gradual rise will thus preferably be carried out with a ramp, or several ramps optionally having different slopes, these ramps being optionally separated by intermediate plateaus, in order to attain the maximum temperature mentioned above, also called a plateau or sintering temperature.

Said temperature ramp(s) is (are) preferentially a slope from 50° C. to 200° C./min, for example 80° C./min or 100° C./min.

For the pressure, in the same way it is possible to advantageously produce a gradual rise with a ramp, or several ramps optionally having different slopes, these ramps being optionally separated by intermediate plateaus, in order to reach the maximum pressure indicated above, also called a plateau or sintering pressure.

Said pressure ramp(s) is (are) generally a slope from 1 MPa/min to 20 MPa/min, preferably from 5 to 10 MPa/min.

The rise in temperature and the rise in pressure whether they are progressive or not, are preferably achieved simultaneously, concomitantly, within a same duration.

If several pressure ramps and several temperature ramps are performed, the corresponding pressure and temperature ramps preferably have the same duration.

By applying the temperature (and therefore intensity) and/or pressure (and therefore applied force) parameters gradually and not abrupt, sudden, instantaneous, subjecting the material to too strong stresses is thereby avoided and no breaking of the material is reported.

As an example, a rise in temperature, from room temperature (generally 20° C. to 25° C.) up to 1,000° C., may be carried out in the following way (see FIG. 2; it should be noted that the cycle of FIG. 2 up to 1,000° C. is compliant with the invention, but it does not give the most dense material):

room temperature to 570° C.: about 5 minutes;
570° C. to 600° C.: about 4 minutes;
600° C. to 1,000° C.: about 5 minutes;
plateau at 1,000° C.: about 5 minutes;
cooling from 1,000° C. to room temperature: a duration conditioned by the thermal inertia of the machine, for example from 10 minutes to 30 minutes, notably 15 minutes.

During the same time, the pressure varies in the following way:

from 0 to 3.2 kN, 40 MPa: rise in 1 minute;
plateau at 3.2 kN, 40 MPa: 20 minutes;
lowering from 3.2 kN to 0 kN: 1 minute.

Still as an example, a rise in temperature, from room temperature (generally 20° C. to 25° C.), this time up to 1,200° C., may be carried out in the following way (this cycle may be illustrated by slightly adapting FIG. 2):

room temperature to 570° C.: about 5 minutes;
570° C. to 600° C.: about 4 minutes;
600° C. to 1,200° C.: about 7.5 minutes;
plateau at 1,200° C.: about 5 minutes;
cooling from 1,200° C. to room temperature: a duration conditioned by the thermal inertia of the machine, for example from 10 minutes to 30 minutes, notably 20 minutes.

During the same time, the pressure varies in the following way:

from 0 to 3.2 kN, 40 MPa: rise in 1 minute;
plateau at 3.2 kN, 40 MPa: 22.5 minutes;
lowering from 3.2 kN to 0 kN: 1 minute.

The current is applied in the form of series, trains of pulses; each series, train, consisting of a determined and adjustable number of "pulses". The series (trains) are separated from each other by a period during which the applied current is zero.

In the method according to the invention, pulses from 1 to 5 ms, for example from 3.3 ms of period, generally assembled as a train from 1 to 15, for example 12 pulses are generally used, each train being generally separated by 1 to 15 periods, for example 2 periods, with the duration (such as 3.3 ms) above, without any current.

It is possible to change these values but the current should always keep the same geometry, i.e.: more or less pulse trains separated by variable periods without any current.

The applied voltage is of a few volts, generally from 1 to 8 volts, preferably from 2 to 7 volts, typically 3 volts for 500 A.

At the end of the cooling, generally down to room temperature, for example from 20° C. to 25° C., the composite material is recovered in the "SPS" device.

The material according to the invention, because of its excellent mechanical and strength properties at high temperatures finds its application in fields as diverse as aeronautics, aerospace for example for manufacturing radomes, the chemical industry and generally in all the fields where excellent mechanical properties at high temperatures are required.

The invention will now be described with reference to the following examples, given as an illustration and not as a limitation.

EXAMPLES

Examples 2 to 4 are examples which show that it is preferable to use the procedure discussed above for obtaining certainly hexagonal BAS.

1. Raw Materials Used.
a. Alumina ($Al_2O_3$).

Alumina powder of reference 265497 comes from SIGMA-ALDRICH. The $d_{50}$ of the particles is 10 μm and its purity is 99.7%
b. Silica ($SiO_2$).

The silica powder is from SIGMA-ALDRICH, its reference is S5631. This is $SiO_2$ in quartz form with a purity close to 99%, and a grain size comprised between 0.5 and 10 μm, for which 80% of them is between 1 and 5 μm.
c. Barium Carbonate ($BaCO_3$).

The barium carbonate powder is from SIGMA-ALDRICH, its reference is 237108. Its average grain size is 5 μm, and its purity is greater than 99%.
d. Alumina Fibers ($Al_2O_3$).

Alumina fibers Nextel 610°, from 3M®, are used as a reinforcement for the composite. The fibers are deenzymated beforehand in an oven at 500° C. in air. They have a diameter of 10 μm and they are cut out with a pair of scissors to a length of about 1 mm.

2. Experimental Procedure.
a. Procedure for Mixing the Powders.

The powders are weighed on METTLER AE260 Delta-Range® scales in the proportions indicated in Table 1.

The powders are then placed in Retsch minijars in tungsten carbide (WC). 1 g of ethanol is added to the mixture of powders. Ethanol is used as a solvent for the mixture.

Two balls of 7 mm and five balls with a diameter of 3 mm made of WC are used as milling bodies for the mixture.

The minijars are then closed and stirred for 30 min at 25 Hz by means of a vibratory milling machine Retsch MM200. Once the mixing is achieved, the obtained suspension is emptied into a crystallizer and the minijars rinsed with ethanol. The rinsing liquid is also poured into the crystallizer. The crystallizer is then heated (STUART CR162) to 100° C. in order to evaporate the ethanol. Once the ethanol is removed, the powder is scraped by means of an aluminium spatula and recovered in flasks.

TABLE 1

| | Amount of material to be mixed | | |
| --- | --- | --- | --- |
| | $BaCO_3$ | $Al_2O_3$ | $SiO_2$ |
| Mass (g) | 0.47 | 0.24 | 0.29 |
| Mole (mg) | 1 | 1 | 2 | b. Preparation of the BAS Powder.

The BAS is synthesized in a tubular oven according to a two-step procedure.

The first step consists of mixing the $BaCO_3$ and $SiO_2$ powders in a molar ratio of 1 $BaCO_3$ for 2 $SiO_2$, and then of sintering the mixture of powders at 1,150° C. in air for 4 h in a Carbolite tubular oven.

The mixture of powders is then transformed into $BaSi_2O_5$.

Next, in a second step, the $BaSi_2O_5$ compound is milled in the vibratory milling machine Retsch for 1 h, and then mixed with alumina with a molar ratio of 1 $BaSi_2O_5$ for 1 $Al_2O_3$. This new mixture is then sintered in a Carbolite tubular oven at 1,200° C. in air for 6 h.

This separation into two steps gives the possibility of improving the reaction kinetics and thus promoting the appearance and the preponderance of the $BaAl_2Si_2O_8$ (BAS) compound.

c. Preparation of the Composite Material According to the Invention.

The BAS is milled and reduced into powder by means of the vibratory milling machine Retsch for 2 h.

The BAS powder and the reinforcing fibers are then mixed for only 1 min, with the vibratory milling machine Retsch, in order not to damage the fibers too much. The total mass of powder and fiber is set to 1 g, including 20% by mass of fiber. The mixture is carried out via a liquid route in ethanol (about 1 g).

d. Sintering of the Mixture of the BAS Powder and of the Fibers by a Hot Sintering method with a pulsed electric field ("spark plasma sintering" or "SPS").

The sintering of the mixture of the BAS powder and of the fibers is carried out according to the invention by a hot sintering method with a pulsed electric field ("spark plasma sintering" or "SPS"), or flash sintering.

The SPS method may be carried out with a device such as the one illustrated in FIG. 1, already described above.

A sheet of Papyex® (graphite sheet) is cut out to the internal dimensions of the graphite mould, and then it is optionally partly coated with BN, for example by spraying with an aerosol spray can, and is then rolled and placed in this mould.

The lower graphite piston is then inserted into the mould.
A disc of Papyex® of the same dimension as the piston is deposited at the bottom of the mould.

The mixture of BAS powder and of reinforcing fibers prepared as described above, is introduced by means of a spatula into the graphite mould.

This mixture of BAS powder and of reinforcing fibers is then covered with another disc of Papyex®, and the upper graphite piston is then inserted.

As this has been indicated already above, it is also possible to cover the Papyex® with a boron nitride (BN) layer. This deposition may be carried out for example by spraying on a portion of a simple face of each sheet, disc, by means of an aerosol spray can.

The graphite mould is finally covered with a graphite felt for limiting radiation and preventing a possible explosion of the mould.

The mould is placed in the machine as indicated in the schematic view of FIG. 1.

The chamber is first closed and then application of a vacuum is initiated. When the vacuum attains a few Pascal (less than 10 Pa), sintering may begin. The applied pressure is 40 MPa and the temperature ramps are 80° C./min between 600° C. and 1,000° C. or 1,200° C.

Figure 2:
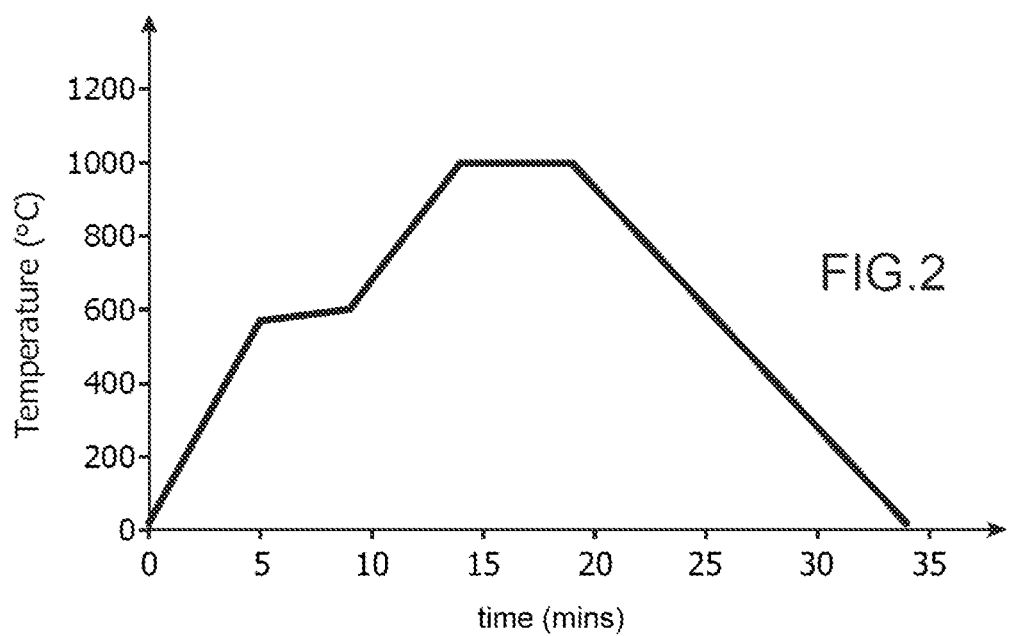
FIG. 2 is a graph which shows a thermal cycle used during the sintering step by SPS of the method according to the invention.

The temperature cycle used for 1,000° C. is illustrated in FIG. 2.

Example 1

In this example, a composite material according to the invention is prepared.
a. Preparation of the BAS.
i. First Heat Treatment Carried Out at 1,150° C. for 4 h, on a Mixture of $BaCO_3$ and $SiO_2$ Powders.

A first heat treatment is carried out with a mixture of $BaCO_3$ (SIGMA-ALDRICH) and of $SiO_2$ (SIGMA-ALDRICH) at 1,150° C., for 4 hours. The obtained sintered material is very white and quite brittle.

Further, FIGS. 3 and 4 show that the reaction between $SiO_2$ and $BaCO_3$ is not complete.

There exist several phases and EDS analysis allows determination of the atoms constituting said phases.

Thus, there remains a non-negligible amount of unreacted $SiO_2$. The matrix therefore consists of one third of $SiO_2$ and of two thirds of a phase based on Ba, Si and O. The silica is not detected on the diffractogram of FIG. 3 since it should be in an amorphous form.
ii. Second Heat Treatment, Carried Out at 1,200° C. for 6 h on a Mixture of the Material Obtained at the End of the First Heat Treatment and of an $Al_2O_3$ Powder.

The material obtained earlier, milled, at the end of the first heat treatment is mixed with $Al_2O_3$ (SIGMA-ALDRICH) and then the whole is heat treated at 1,200° C. for 6 hours.

The obtained sintered material is not brittle.

The micrograph of FIG. 6 indicates the presence of a phase corresponding to BAS which represents more than half of the material (see also the diffractogram of FIG. 5).

However, there remain particles consisting of aluminium and oxygen atoms. These particles are residual alumina. There exists a pale gray phase not containing any aluminium. The reaction is therefore incomplete. Moreover, it is interesting to note the total disappearance of the silica.
b) Elaboration of the Composite Material According to the Invention.

The BAS obtained at the end of the second heat treatment described above is mixed with alumina fibers and then sintered by SPS according to the procedure described above.

Sintering tests are conducted by observing a plateau at a temperature of 1,000° C. for 5 minutes, and other sintering tests are conducted by observing a plateau at a temperature of 1,200° C. for 5 minutes.

As shown by the micrograph of FIG. 7, sintering by SPS at 1,000° C. does not sufficiently densify the matrix of the composite.

At 1,200° C., (FIG. 8), the densification seems to be total and the fibers do not show any deformations related to the heat treatment or to the pressure.

FIGS. 9 and 10 and notably FIG. 10 show that the matrix actually penetrates into the small spaces between the fibers.

Further, the fibers do not have any decohesion or reaction with the matrix.

Many dark fragments may be observed in FIGS. 9 and 10. These fragments are made of alumina and certainly come from the fibers.

It would be the mixture which would have generated these fragments. The diffractogram of FIG. 11 indicates that the structure no longer contains any barium silicate on the one hand, and that a small portion of the hexagonal phase ("hexacelsian") has become monoclinic ("celsian") on the other hand.

If there is no more silicate, this means that the whole matrix consists of $BaAl_2Si_2O_8$. No cracking is observed.

In the examples 2 to 4 which follow, it is seen that it is preferable to use a BAS prepared by the procedure described above, when it is desired to prepare a composite material comprising a BAS matrix with a hexagonal structure, and reinforcement fibers made of alumina.

Example 2

In this example, the simultaneous mixing in a single step of the three initial powders of $BaCO_3$, $Al_2O_3$, and $SiO_2$ is performed and then it is proceeded with sintering by SPS of this mixture of powders (without any fibers).

The powders used in this example are the powders described in points 1.a., 1.b., and 1.c. above.

The three initial powders are weighed and mixed according to the procedure shown in point 2.a. above. However, unlike the procedure shown in point 2.b., the three powders are simultaneously mixed in a single step, in the proportions of table 1.

Sintering by SPS is then carried out with a plateau at 1,000° C. for 5 minutes, of the thereby obtained mixture of powders.

The micrograph of the section of a thereby obtained pellet by sintering by SPS of the mixture of the three $BaCO_3$, $Al_2O_3$ and $SiO_2$ powders (SIGMA-ALDRICH) according to the cycle shown in FIG. 2 with a plateau at 1,000° C. for 5 minutes, is shown in FIG. 13.

In this section, the silica grains are all coated with a pale shell rich in barium. On the contrary, the alumina grains do not have any particular surroundings, they do not seem to have reacted.

Moreover, the diffractogram of FIG. 12 reveals the presence of a phase close to the over-stoichiometric BAS in Si. This phase indicates that the formation of the BAS has nevertheless begun.

The synthesis of BAS by SPS shows that the reaction between $BaCO_3$ and $SiO_2$ is promoted.

Example 3

In this example, the simultaneous mixing in a single step of the three initial powders of $BaCO_3$, $Al_2O_3$, and $SiO_2$ is carried out and then it is proceeded with sintering by SPS of this mixture of powders (without any fibers).

The powders used in this example are not the powders described in points 1.a., 1.b., and 1.c. above. Indeed, instead of slowing down the reaction by SPS, between the $BaCO_3$ and $SiO_2$, and to allow reaction with $Al_2O_3$, it was decided to use in this example, a coarser powder of $SiO_2$ (PROLABO) (d50=100 µm) and a finer $Al_2O_3$ powder (ATOCHEM) (d50=5 µm).

The three initial powders are weighed and mixed according to the procedure shown in point 2.a. above. However, unlike the procedure shown in point 2.b., the three powders are simultaneously mixed in a single step, in the proportions of table 1.

Sintering by SPS is then carried out with a plateau at 1,000° C. for 5 minutes, of the thereby obtained mixture of powders.

The micrograph of the section of a thereby obtained pellet by sintering by SPS of the mixture of the three powders of $BaCO_3$, $Al_2O_3$ and $SiO_2$ (SIGMA-ALDRICH) according to the cycle shown in FIG. 2 with a plateau at 1,000° C. for 5 minutes, is shown in FIG. 15.

The micrograph of FIG. 15 shows several phases. The darkest spots correspond to silicon and oxygen. These are certainly large silica grains. Around these grains a pale gray casing has formed of a mixture of Ba, Si and C. A phase consisting of Ba, Al, Si and O appears in dark grey. This phase may be the sought BAS. There also exist Al and O platelets which would likely be alumina platelets. These platelets moreover seem to be in equilibrium with the dark grey Ba—Al—Si—O phase. Finally, it is possible to note the presence of a very pale phase containing tungsten. This tungsten comes from the mixing operation.

The pellets characterized in XRD (FIG. 14) reveal the presence of BAS in a hexagonal form. This phase is certainly the one observed in dark grey in SEM. Also there are probably barium silicates such as sanbornite ($BaSi_2O_5$) and $Ba_5Si_8O_{21}$ which would be in the pale areas close to the $SiO_2$ grains. Alumina in the form of corundum may be residual platelets. The silica does not appear on the spectrum, the residual silica is no doubt amorphous.

Example 4

In this example, annealing is carried out with a plateau at a temperature of 1,150° C. for 4 hours of the pellets prepared in example 3.

The annealing operations are carried out in a Carbolite tubular oven.

The ramps are 500° C.·h$^{-1}$ and the plateau is 4 h at 1,150° C. This treatment is carried out in air. The annealing has the purpose of homogenizing the structure of the material.

The material after annealing essentially consists of $BaAl_2Si_2O_8$ as shown by the diffractogram and the micrograph of FIGS. 16 and 17.

However, this BAS has been subject to a transformation of a hexagonal phase into a monoclinic phase.

Thus, the structure of the material of the pellet has been subject to significant stresses which have caused cracks visible in FIG. 17.

Moreover, the residual phases are either alumina or a compound based on Ba, Si and O.

The reaction is almost complete, the annealing has actually played its role for homogenizing material. However, it is not desirable to obtain the monoclinic form, when use of alumina reinforcements is desired. Thus, annealing of this type is not to be used in the case when use of alumina reinforcements is desired.

Examples 2 to 4 clearly show that it is not possible to obtain hexagonal BAS by simultaneously mixing the three initial powders $BaCO_3$, $Al_2O_3$ and $SiO_2$, even by acting on the grain size of the powders and by carrying out an annealing step.

Indeed, this annealing step promotes the formation of the monoclinic phase of BAS which is incompatible with an alumina fiber reinforcement since the difference in the fiber/matrix expansion coefficients is too high which has the consequence of generating cracks within the material.

REFERENCES

[1] I. G Talmy, D. A Haught, "*Celsian-based ($BaO·Al_2O_3·2SiO_2$) ceramics as candidates for radomes*", Proceedings of the 14th Conference on metal carbon and ceramic composites, NASA Conf. Publ. 3097, Part I; 1990, p. 239-50.

[2] N. P. Bansal, J. A. Setlock "*Fabrication of fiber-reinforced celsian matrix composites*", Composites: Part A 32 (2001), 1021-1029.

[3] C. H. Drummond, N. P. Bansal, "Crystallization behavior and properties of $BaO·Al_2O_3·2SiO_2$ Glass matrices", NASA Contractor report 185209, February 1990.

[4] G. N. Shabanova, V. V. Taranenkova, A. N. Korogodskaya, and E. V. Khristich, "*Structure of the BaO-Al$_2$O$_3$—SiO$_2$ system (a review)*", Glass and Ceramics, Vol. 60, Nos. 1-2, 2003, translated from Steklo I Keramika, No. 2, p. 12-15, February 2003.

[5] Feng Ye, Limeng Liu, Jingxian Zhang, Qingchang Meng, "*Synthesis of 30 wt % BAS/Si$_3$N$_4$ composite by spark plasma sintering*", Composites Science and Technology 68 (2008), 1073-1079.

[6] A. Kremenovic, Ph. Colomban, B. Piriou, D. Massiot, P. Florian, "*Structural and spectroscopic characterization of the quenched Hexacelsian*", Journal of Physics and Chemistry of Solids 64 (2003), 2253-2268.

[7] CN-A-1931785

[8] CN-A-101428971

[9] Feng Ye, J. C. Gu, Y. Zhou, and M. Iwasa, "*Synthesis of BaAl$_2$Si$_2$O$_8$ glass-ceramic by a sol-gel method and the fabrication of SiC$_{pf}$/BaAl$_2$Si$_2$O$_8$ composites*", Journal of the European Ceramic Society, 23 (2003), 2203-2209.

[10] U.S. Pat. No. 5,281,559

[11] U.S. Pat. No. 5,214,004

[12] U.S. Pat. No. 5,256,610

[13] U.S. Pat. No. 5,389,321

[14] FR-A-2751321

[15] FR-A-2677641

[16] JACS, 83 (12), p. 2907-2912, 2000.

The invention claimed is:

1. A method for preparing a composite material consisting of a matrix made of at least one aluminosilicate, reinforced by reinforcements made of at least one metal oxide or metalloid oxide, the at least one metal oxide or metalloid oxide having a thermal expansion coefficient with a value that is within 30% of the thermal expansion coefficient of said at least one aluminosilicate, the method comprising the following successive steps a) to d):

a) placing into contact a powder of at least one aluminosilicate selected from barium aluminosilicate BAS, barium and strontium aluminosilicate BSAS, strontium aluminosilicate SAS, and mixtures thereof, with reinforcements made of at least one metal oxide or metalloid oxide having a thermal expansion coefficient with a value that is within 30% of the thermal expansion coefficient of said at least one aluminosilicate;

b) sintering the powder of at least one aluminosilicate and the reinforcements made of at least one metal oxide or metalloid oxide by a hot sintering method using a pulsed electric field;

c) cooling the sintered powder and reinforcements; and d) recovering the composite material.

2. The method according to claim 1, wherein the powder of at least one aluminosilicate is barium aluminosilicate BAS powder.

3. The method according to claim 2, wherein the BAS in majority by mass comprises BAS of hexagonal structure.

4. The method according to claim 3, wherein the BAS powder, wherein in majority by mass comprises BAS of hexagonal structure, is prepared by carrying out the following successive steps:

mixing $BaCO_3$ powder and $SiO_2$ powder in a molar ratio of 1 $BaCO_3$ for 2 $SiO_2$;

drying and then sintering the mixture of the $BaCO_3$ powder and of the $SiO_2$ powder to obtain a compound in majority consisting of the compound $BaSi_2O_5$;

milling the compound in majority consisting of $BaSi_2O_5$ to obtain a powder of said compound in majority consisting of $BaSi_2O_5$;

mixing the powder of the compound in majority consisting of $BaSi_2O_5$, and $Al_2O_3$ powder, in a molar ratio of 1 $BaSi_2O_5$ for 1 $Al_2O_3$;

drying and then sintering the mixture of the powder of the compound in majority consisting of $BaSi_2O_5$, and of the $Al_2O_3$ powder; and milling the sintered mixture to obtain the BAS powder which in majority by mass comprises BAS of hexagonal structure.

5. The method according to claim 3, wherein the reinforcements are made of alumina.

6. The method according to claim 2, wherein the BAS in majority by mass comprises BAS of monoclinic structure.

7. The method according to claim 6, wherein the reinforcements are made of silica and/or made of mullite.

8. The method according to claim 1, wherein the reinforcements made of at least one metal oxide or metalloid oxide appear in one or more form(s) selected from particles and fabrics of fibers.

9. The method according to claim 8, wherein the at least one metal oxide or metalloid oxide is in the form of particles and the particles are selected from long fibers having a length of from 100 μm to 10 mm and short fibers (whiskers) having a length of from 0.5 μm to 100 μm.

10. The method according to claim 8, wherein the step a) further comprises preparing a mixture of a powder of the at least one aluminosilicate and of particles of the at least one metal oxide or metalloid oxide.

11. The method according to claim 10, wherein the at least one aluminosilicate is barium aluminosilicate powder.

12. The method according to claim 8, wherein the step a) further comprises impregnating a fabric of fibers comprising the at least one metal oxide or metalloid oxide with a slurry of the powder of at least one aluminosilicate.

13. The method according to claim 12, wherein the at least one aluminosilicate is barium aluminosilicate powder.

14. The method according to claim 1, wherein the matrix represents 99 to 50% by mass of the material, and the reinforcements represent 1 to 50% by mass of the material.

15. The method according to claim 1, wherein the composite material is a dense material with a density from 80% to 100% of the theoretical density.

* * * * *